United States Patent
Wong et al.

(10) Patent No.: US 6,324,181 B1
(45) Date of Patent: Nov. 27, 2001

(54) FIBRE CHANNEL SWITCHED ARBITRATED LOOP

(75) Inventors: Don Yih Wong, Saratoga; David A. Kranzler, Belmont; Ruchi Wadhawan, Sunnyvale; Craig Owens, Belmont, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/062,158

(22) Filed: Apr. 16, 1998

(51) Int. Cl.$^7$ ..................................................... H04J 3/02
(52) U.S. Cl. ........................ 370/403; 370/254; 370/455; 370/462
(58) Field of Search .................................. 370/254, 401, 370/402, 403, 404, 405, 452, 455, 460, 461, 462, 463

(56) References Cited

U.S. PATENT DOCUMENTS

| | | | | |
|---|---|---|---|---|
| 5,383,191 | * | 1/1995 | Hobgood et al. | 370/404 |
| 5,751,715 | * | 5/1998 | Chan et al. | 370/455 |
| 5,784,557 | * | 7/1998 | Oprescu | 370/254 |
| 6,000,020 | * | 12/1999 | Chin et al. | 370/401 |
| 6,118,776 | * | 9/2000 | Berman | 370/401 |

* cited by examiner

Primary Examiner—Douglas Olms
Assistant Examiner—Shick Hom

(57) ABSTRACT

In a fibre channel network environment wherein an arbitrated loop is provided a switchable connection with another arbitrated loop, a technique and corresponding apparatus are provided for controlling signal paths through the hubs stack between any two devices such that routing of a signal and interactive communication can be carried out transparently to the fibre channel network without excessive overhead, and wherein control is changed in an orderly manner such that end-to-end device connections are unaware that they are not connected to the same hub. A switched arbitrated loop (SAL) according to the invention provides the concurrent bandwidth resource of a fabric switch without the extra features which would increase design cost and operational overhead. In a specific embodiment, a switched arbitrated loop supports only 126 nodes for stations (plus one fabric port) in a single loop topology. The invention provides the concurrent connections and high bandwidth capabilities of a conventional fabric switch, but at a cost close to that of a conventional hub while behaving such that devices connected to it are unaware that they are not on a normal loop when they are communicating.

12 Claims, 12 Drawing Sheets

System Block Diagram

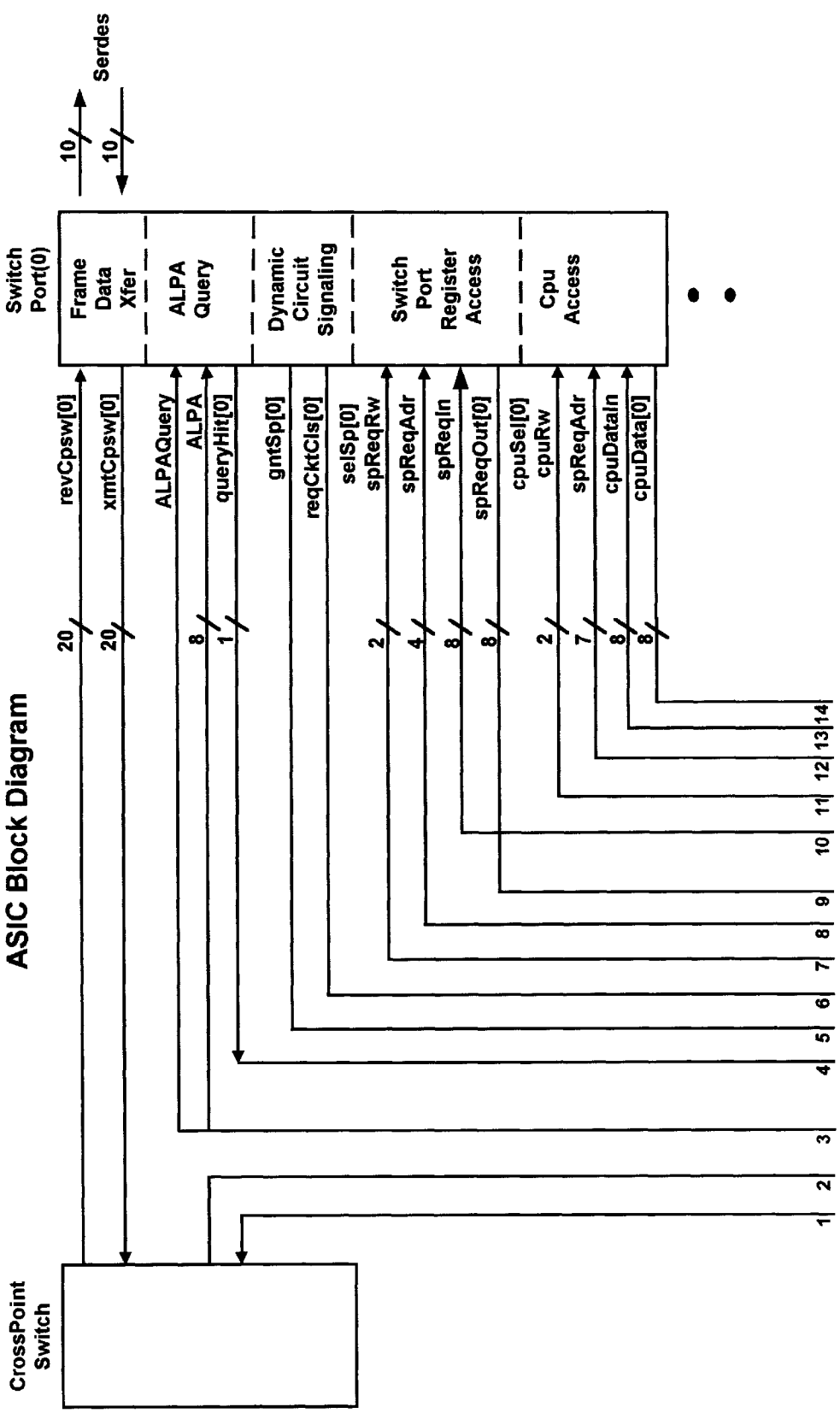
FIG. 7 (pg. 1/2)

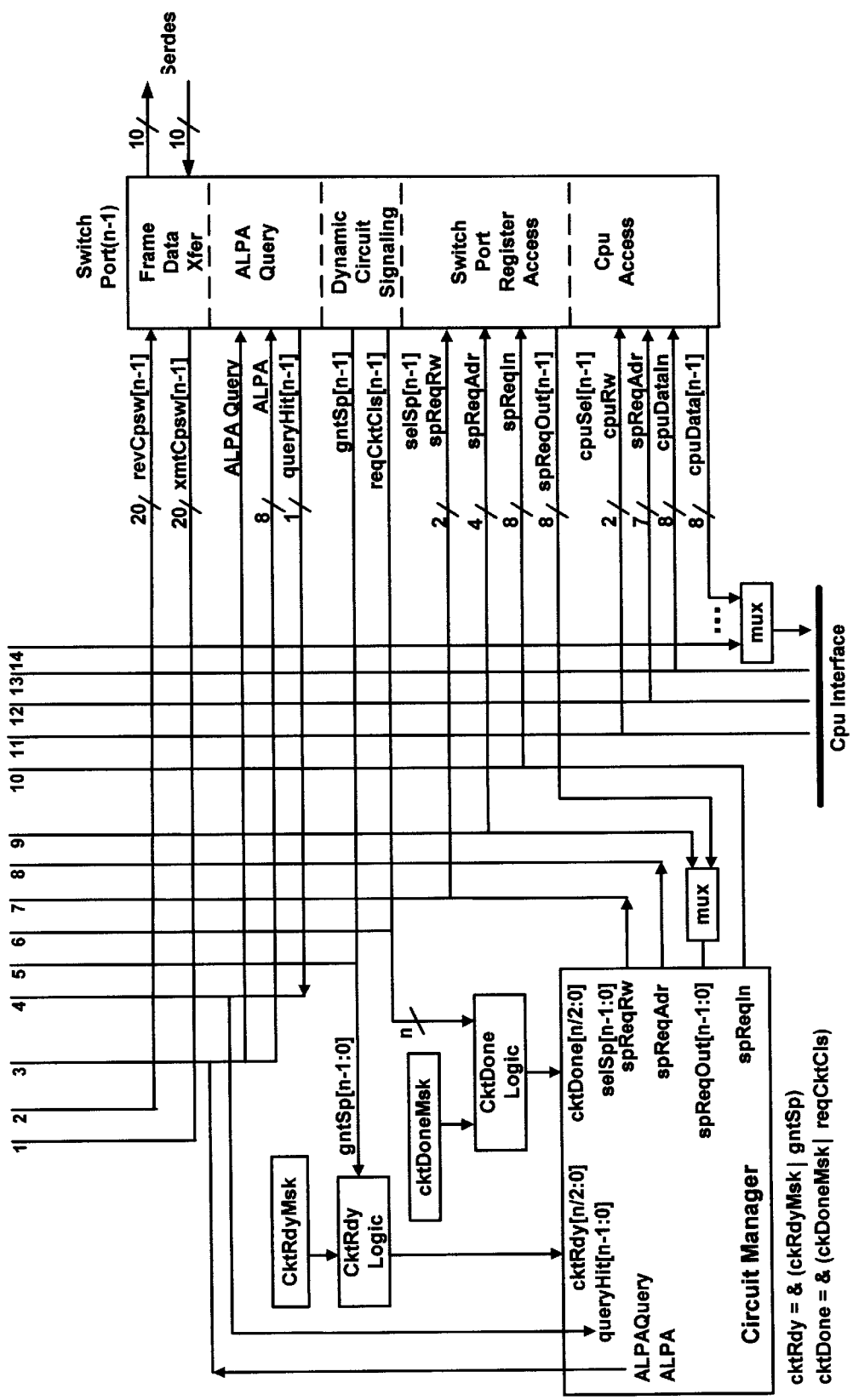
FIG. 7 (continued, pg. 2/2)

FIBRE CHANNEL SWITCHED ARBITRATED LOOP

BACKGROUND OF THE INVENTION

This invention relates to fibre channel arbitrated loop network architecture and more particularly to an adaptation of fibre channel architecture to switchable star architectures. The purpose of the invention is to increase the throughput of fibre channel arbitrated loop networks.

Fibre channel networks are a particular class of high-speed networks defined by ANSI standard X3T11. Fibre channel networks can be constructed in three different topologies: point-to-point, arbitrated loop and fabric switch. Point-to-point networks consist of two stations connected directly to (and only to) each other. Fabric switches can connect networks of up to 16 million stations and provide multiple classes of service (connection-oriented, connection-less with acknowledgement, connection-less without acknowledgement, or intermix).

Referring to FIG. 1, an arbitrated loop topology 10 is shown, which is a shared-bandwidth, logical ring topology designed for low-cost attachment of such stations 12 as servers and disk array devices. Up to 126 stations can communicate on an arbitrated loop 14, but only two stations can communicate interactively at any one time (with an exception for broadcast or multicast conversations). The arbitrated loop standard also allows for a single fabric port 16 to be resident on the loop for connection into the larger network.

In an arbitrated loop topology, stations 12, 16, 18, 20, 22 that intend to communicate on the loop 14 must "arbitrate" for access. Stations signal their intent to arbitrate by issuing a primitive signal for circulation around the loop to all nodes or stations, called an ARB. The ARB is a special ordered set signal which contains the identity of the station that requests access. When multiple stations request access simultaneously, the station with the lowest physical address prevails. (Physical addresses are assigned cooperatively by the stations each and every time the loop topology changes.) A station 12 that wins arbitration then "opens" the station 18 with which it wants to communicate by sending an OPN primitive, which is a special ordered set signal including the address of the target station as an argument. The two stations 12, 18 then communicate in either half-duplex or full-duplex fashion, until both stations agree that the conversation is finished.

Arbitrated loops are typically wired together using hub devices 15 in which the loop is formed among the connected stations. A hub device 15 allows multiple stations to be connected together, although only one conversation can take place at any instant in time. This is analogous to networking topologies such as Token Ring (ISO/IEEE 802.5) and Ethernet (ISO/IEEE 802.3).

Referring to FIG. 2, in networking topologies, such as loop networks 014, 114, 214, 314, the conventional prior art approach to increasing the available bandwidth is to provide passthrough switches 24, 26, 28 which allow multiple concurrent conversations to take place. The disadvantage is a need for extra switching logic and buffer memory to support connections. In fibre channel technology it is conventional to use the fabric switch topology when greater bandwidth is needed. However, fabric switches tend to be complex and expensive, particularly given that they must also implement a large number of standardized features, such as address space resolution, and support for multiple classes of service.

Any modification to the arbitrated loop must behave such that devices connected to it are unaware that they are not on a normal loop when they are communicating. This is important for interoperability with any existing fibre channel arbitrated loop hardware on the market. What is needed is a mechanism whereby any switching element presents an interface equivalent to a loop.

SUMMARY OF THE INVENTION

According to the invention, in a fibre channel network environment wherein an arbitrated loop is provided a switchable connection with another arbitrated loop, a technique and corresponding apparatus are provided for controlling signal paths through the hubs stack between any two devices such that routing of a signal and interactive communication can be carried out transparently to the fibre channel network without excessive overhead, and wherein control is changed in an orderly manner such that end-to-end device connections are unaware that they are not connected to the same hub. A switched arbitrated loop (SAL) according to the invention provides the concurrent bandwidth resource of a fabric switch without the extra features which would increase design cost and operational overhead. In a specific embodiment, a switched arbitrated loop supports only 126 nodes for stations (plus one fabric port) in a single loop topology. The invention provides the concurrent connections and high bandwidth capabilities of a conventional fabric switch, but at a cost close to that of a conventional hub while behaving such that devices connected to it are unaware that they are not on a normal loop when they are communicating.

The invention will be better understood by reference to the following detailed description in connection with the accompanying drawings.

BRIEF DESCRIPTION OF THE DRAWINGS

FIG. 7 is a block diagram illustrating one embodiment of switch arbitrated loop in accordance with one embodiment of the present claimed invention.

DESCRIPTION OF SPECIFIC EMBODIMENTS

Figure 1:
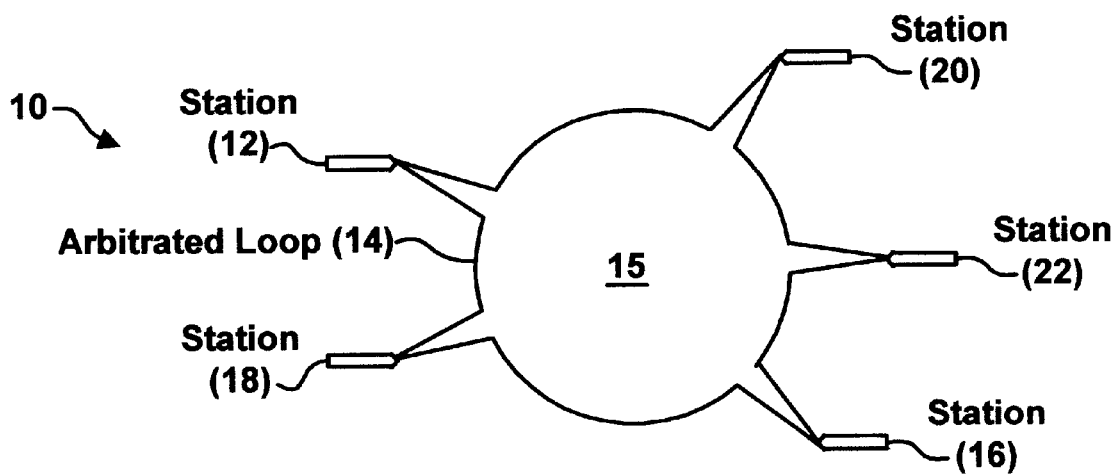
FIG. 1 is a block diagram of a prior art arbitrated loop architecture.
Figure 2:
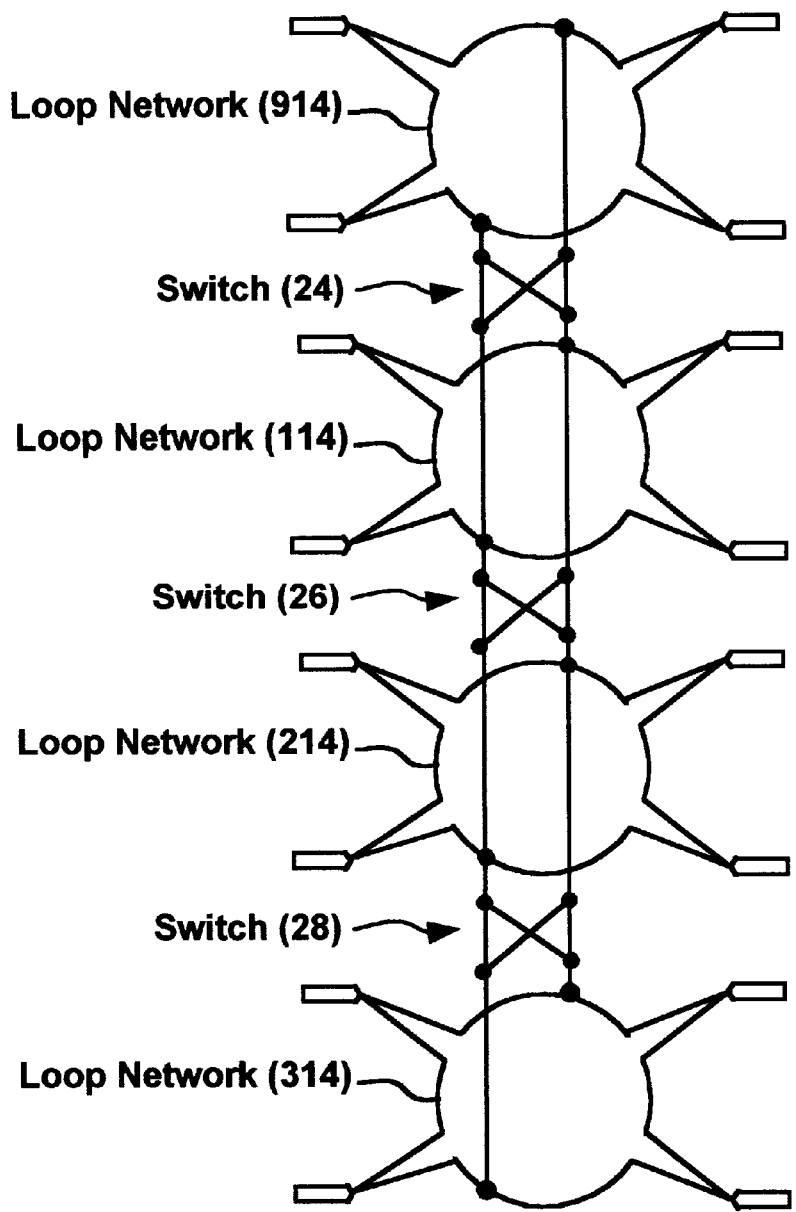
FIG. 2 is a block diagram of a prior art switched hub architecture.
Figure 3:
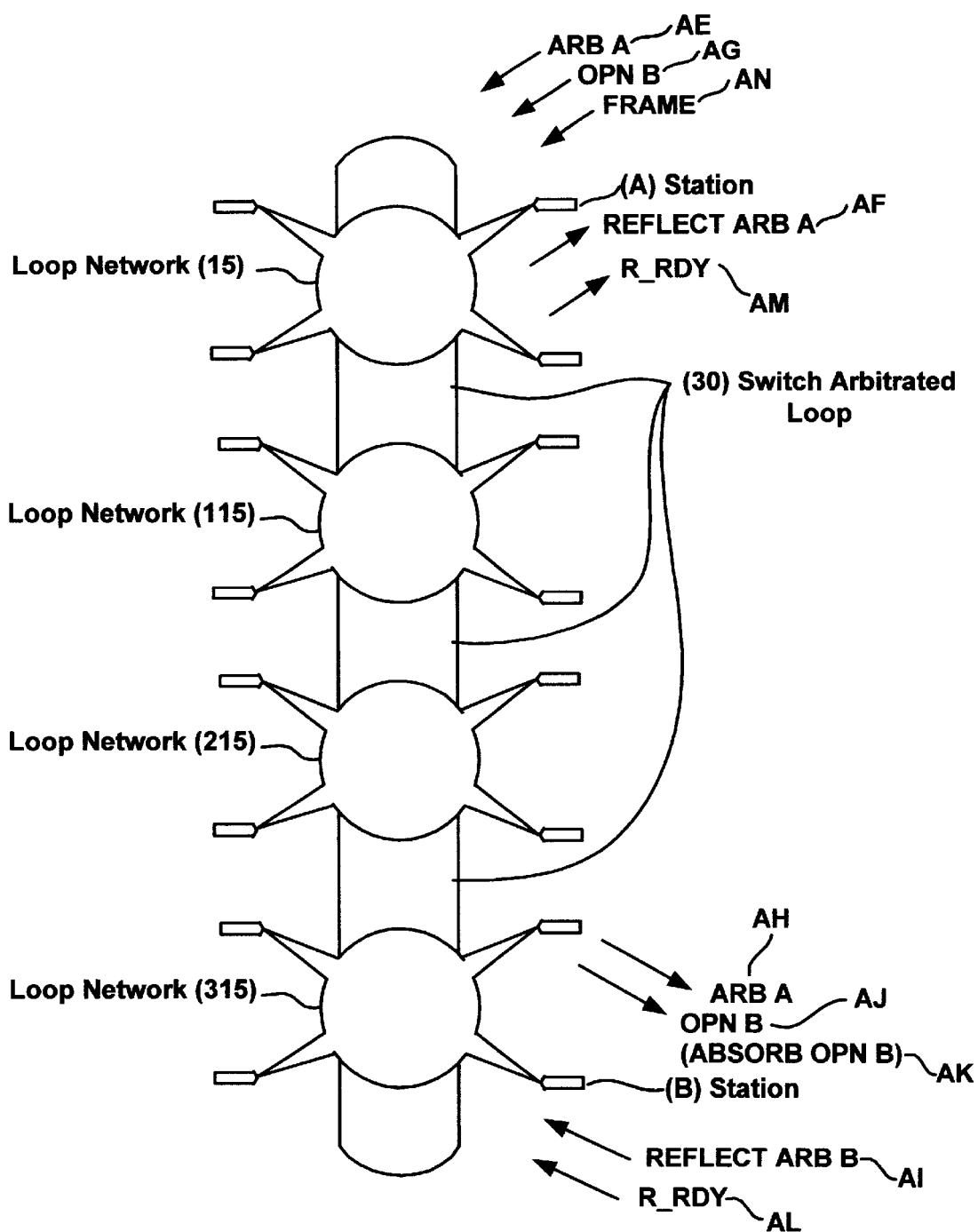
FIG. 3 is a block diagram of an arbitrated loop architecture joined by stacked hubs with an arbitrated switching mechanism according to the invention.

With reference to FIG. 3, an arbitrated loop architecture stacked hub network structure 100 is illustrated. It has an intelligent switch matrix 30 according to the invention, herein called a switched arbitrated loop (SAL) 30. This intelligent switch 30 is a form of node controller which is built into the hub stack formed by the hubs of arbitrated loop networks 15, 115, 215, 315. It can receive and redirect frames with minimal to no buffering between any stations A and B in the entire system. A particular inventive sequence establishes the transparent connection according to the invention, as hereinafter explained.

The arbitrated loop architecture is topology-specific such that each node in the system 100 is assigned a separate physical address in the order of any established priority. In the standardized protocol, flow control credit management is also provided for, as will be clarified hereinafter.

Figure 4:
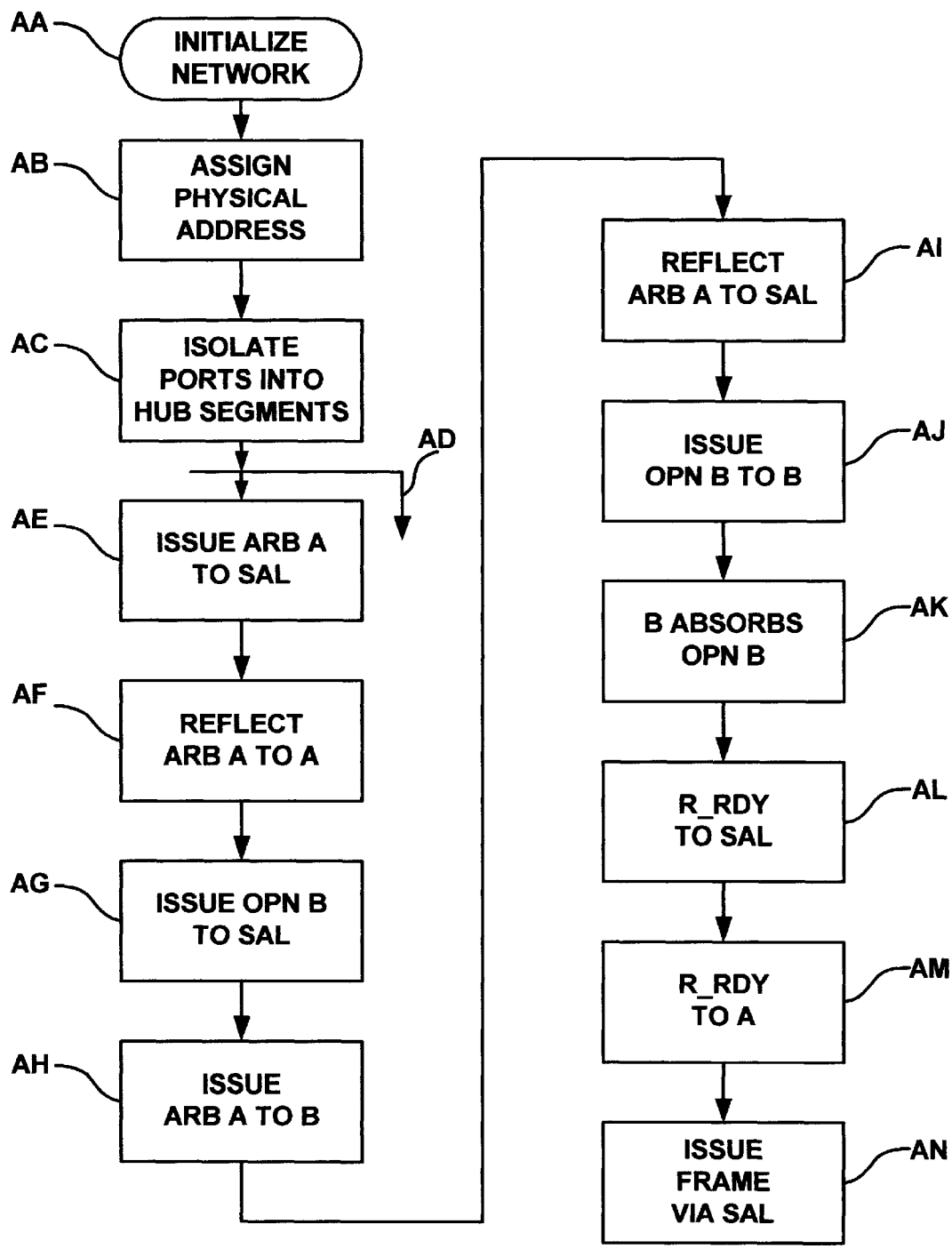
FIG. 4 is a flow chart according to the invention.

In the technique according to the invention, and referring to the flow chart of FIG. 4, the network is initialized by forcing all nodes to be coupled as if to a single common loop (Step AA). Then, according to known established protocol, each node adopts or is assigned a specific physical address (Step AB). Thereupon, the system isolates the switch ports to separate the hub into hub segments (Step AC) that look like conventional hubs.

To establish communication between the first loop port A and the second loop port B through the switched arbitrated loop 30, a loop circuit is thereupon established between the first port A and the second loop port B (Step AD).

The loop circuit is established by issuing at the first loop port A a first "arbitrate A" primitive signal (ARB A) to the switched arbitrated loop 30 (Step AE), the first arbitrate A primitive signal being a request for access to the local loop of first loop port A. Thereafter, in response to the ARB A primitive signal, the switched arbitrated loop 30 issues a reflection of ARB A to the first loop port A (Step AF).

In response to the reflected ARB A, the first loop port issues a first open B primitive signal (OPN B) to the switched arbitrated loop 30 (Step AG), the OPN B being a request to establish a half duplex circuit (or a full duplex circuit, in an alternative) between the first loop port A and the second loop port B across the SAL 30.

In response to the OPN B, the SAL 30, according to the invention, itself issues a second arbitrate A primitive signal (ARB A) to the second loop port B (Step AH), the second ARB A being a request for access to the local loop on which is the loop port B.

In response to the second ARB A, loop port B issues a reflection of the second ARB A to the SAL 30 (Step AI).

In response to the reflected ARB A the SAL 30 itself issues a second OPN B primitive signal (Step AJ), and the second OPN B is then absorbed by loop port B (Step AK).

In response to the second OPN B, which it absorbs, loop port B issues at least one receive ready primitive signal (RECEIVE READY or R RDY) to the SAL 30 (Step AL).

Thereupon the SAL 30 sends at least one R_RDY to the loop port A (Step AM), and the loop port A responds upon receipt by issuing a data frame via the SAL 30 loop port B (Step AN), thereby establishing the circuit.

A further feature of the invention is the ability to initiate data transfer with zero "login credit" at the second loop port B so that considerable savings in buffering can be achieved. According to one alternative of this aspect of the invention without an enhanced feature, a R_RDY is forwarded by the SAL 30 to the first loop port A from the second loop port B in response to the second OPN B primitive signal. In another alternative the R_RDY is generated at the SAL 30 and sent to the first loop port A. This is done to reduce latency normally caused by the wait associated with the issuance and response of each OPN and ARB signal. Whether the R_RDY is generated at the SAL 30, or forwarded by the SAL 30 from the second loop port B, login credit is spoofed to zero at the target port or at any other port to eliminate the need for buffering of data in the SAL 30 and to ultimately control the data traffic.

Figure 5:
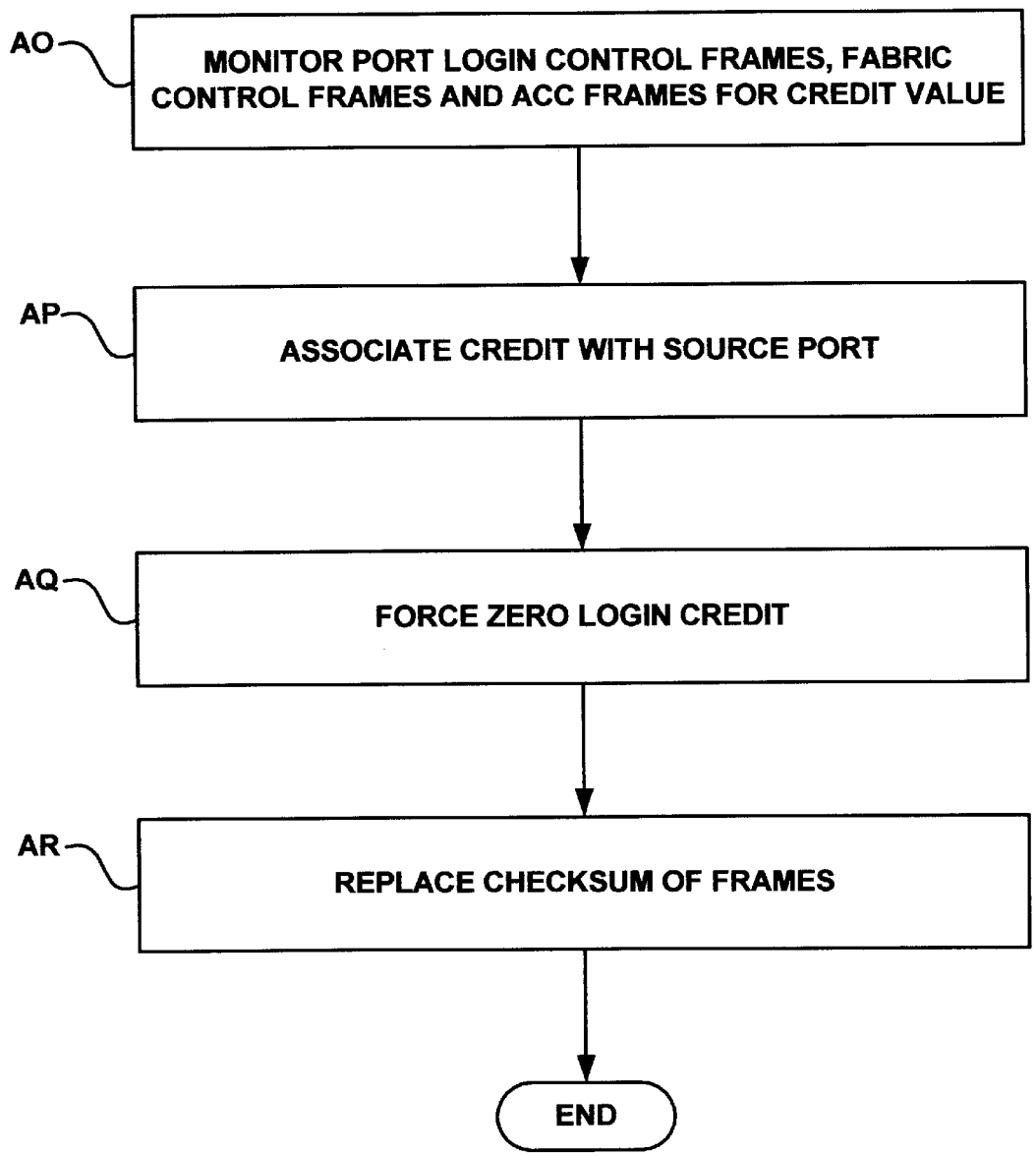
FIG. 5 is a flow chart according to the invention for spoofing login credit.
Figure 6:
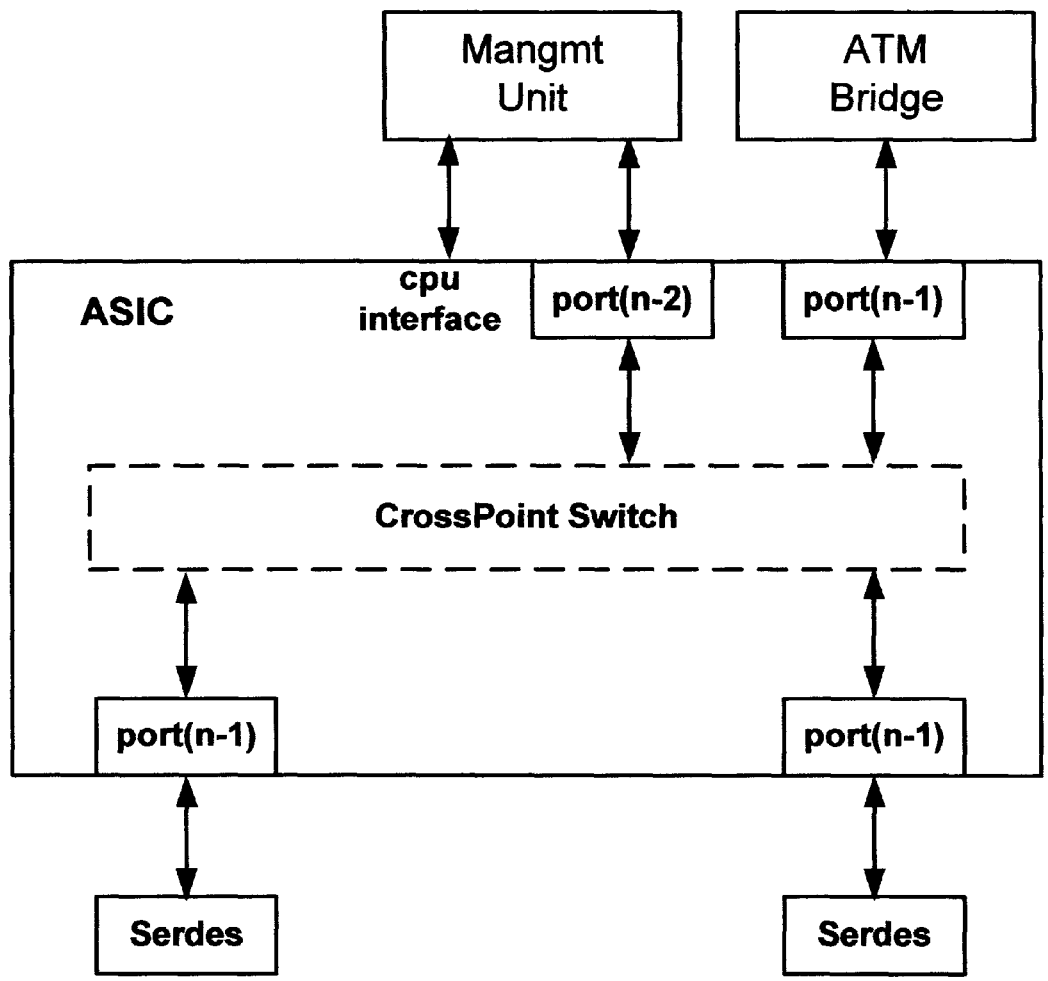
FIG. 6 is a block diagram illustrating one embodiment of switch arbitrated loop in accordance with one embodiment of the present claimed invention.
Figure 8:
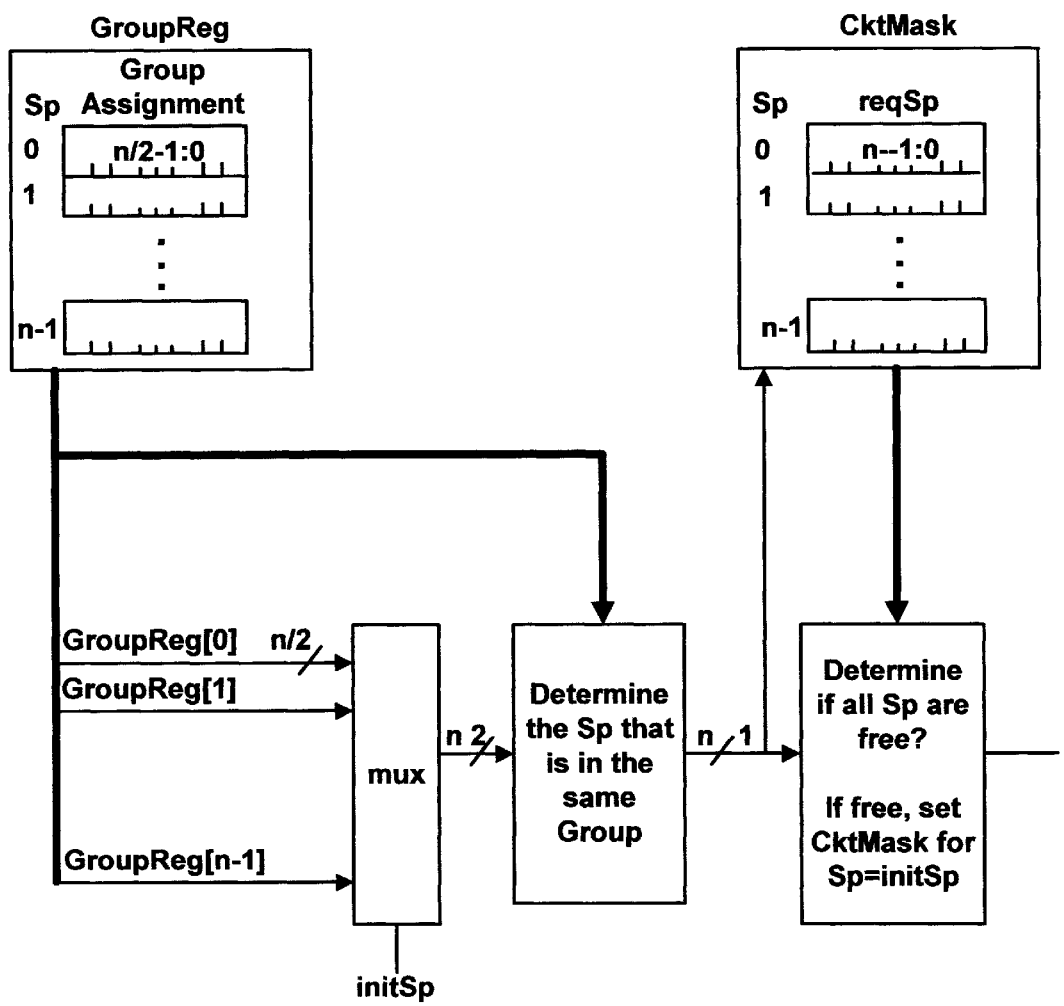
FIG. 8 is a block diagram illustrating one embodiment of switch arbitrated loop in accordance with one embodiment of the present claimed invention.
Figure 9:
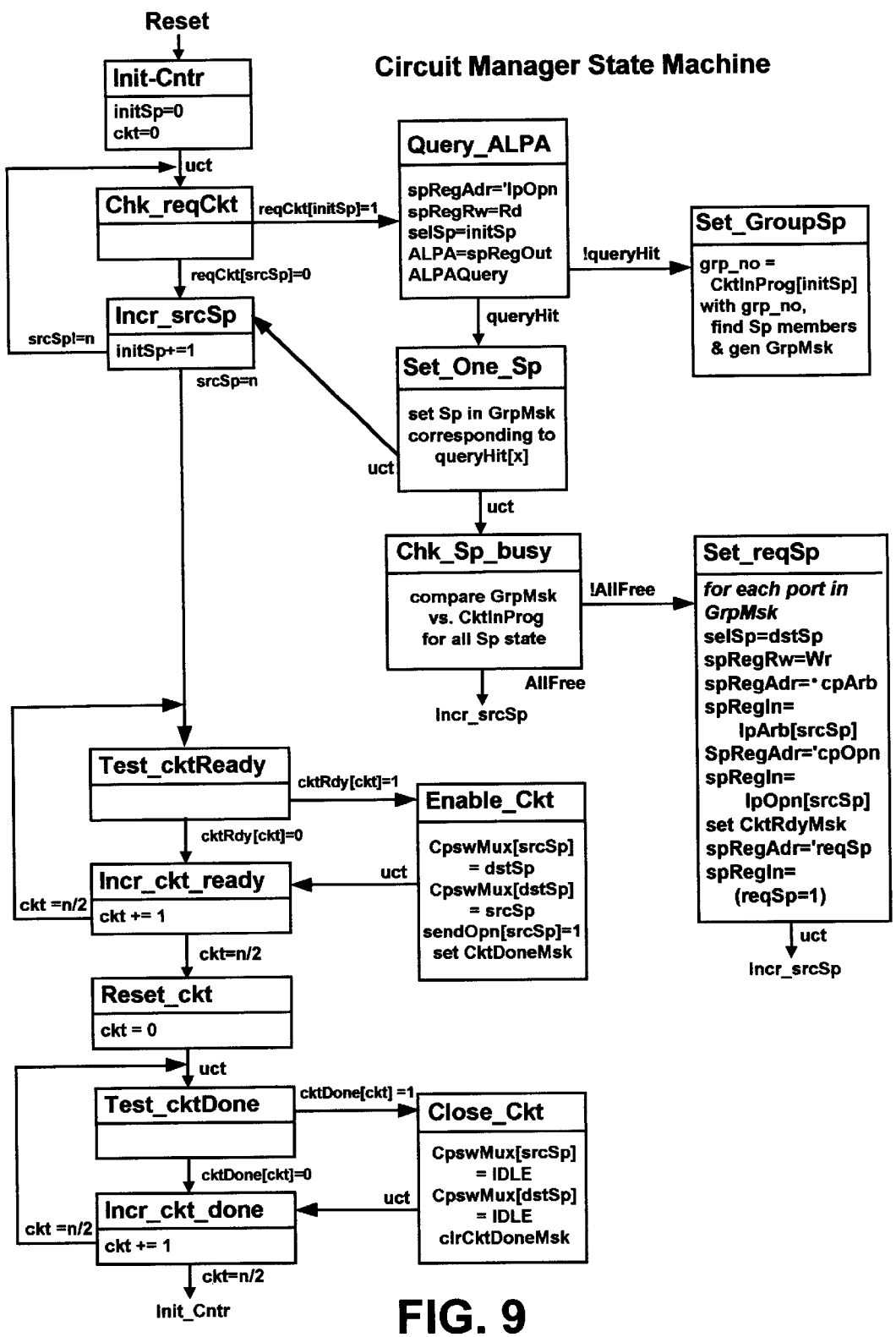
FIG. 9 is a state diagram illustrating one embodiment of switch arbitrated loop in accordance with one embodiment of the present claimed invention.
Figure 10:
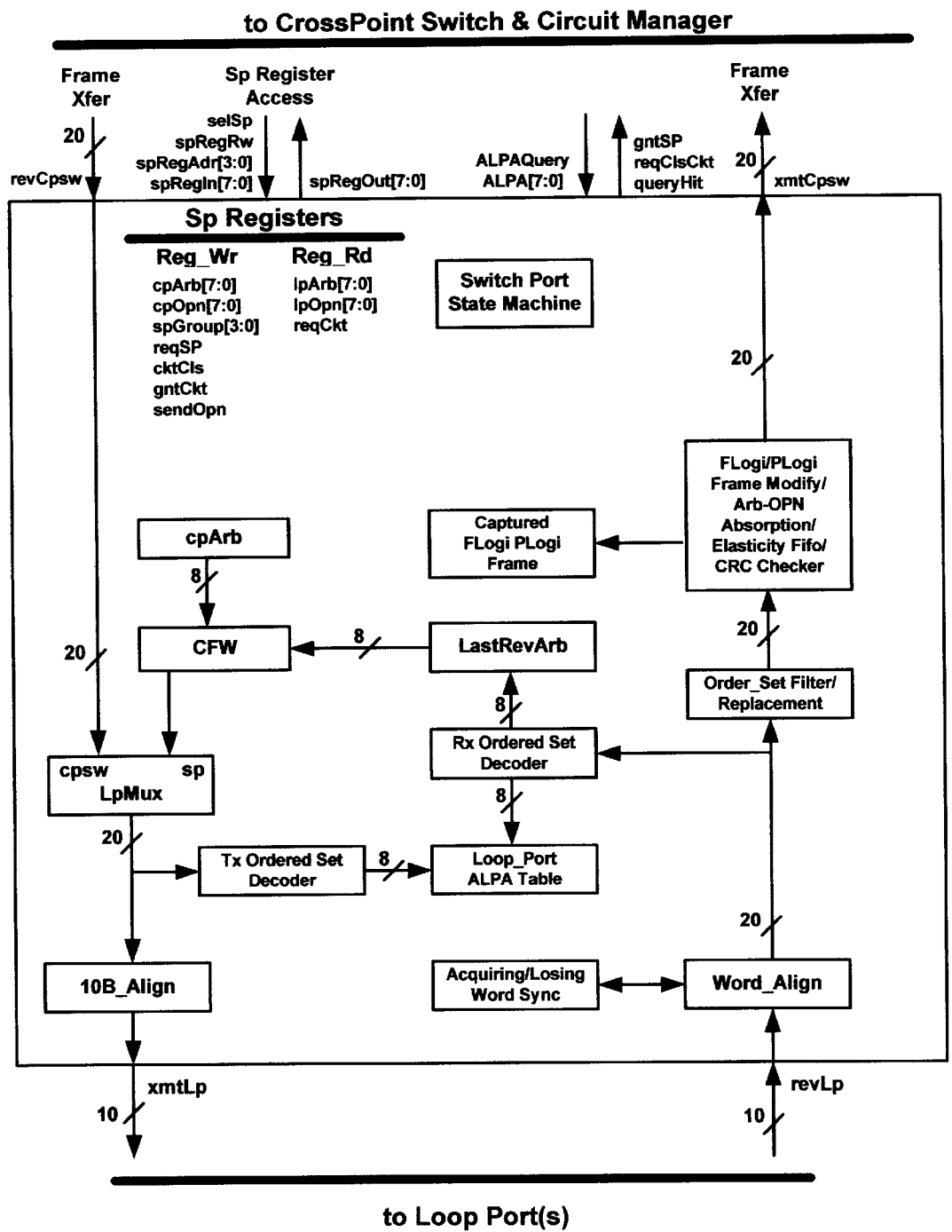
FIG. 10 is a state diagram illustrating one embodiment of switch arbitrated loop in accordance with one embodiment of the present claimed invention.
Figure 11:
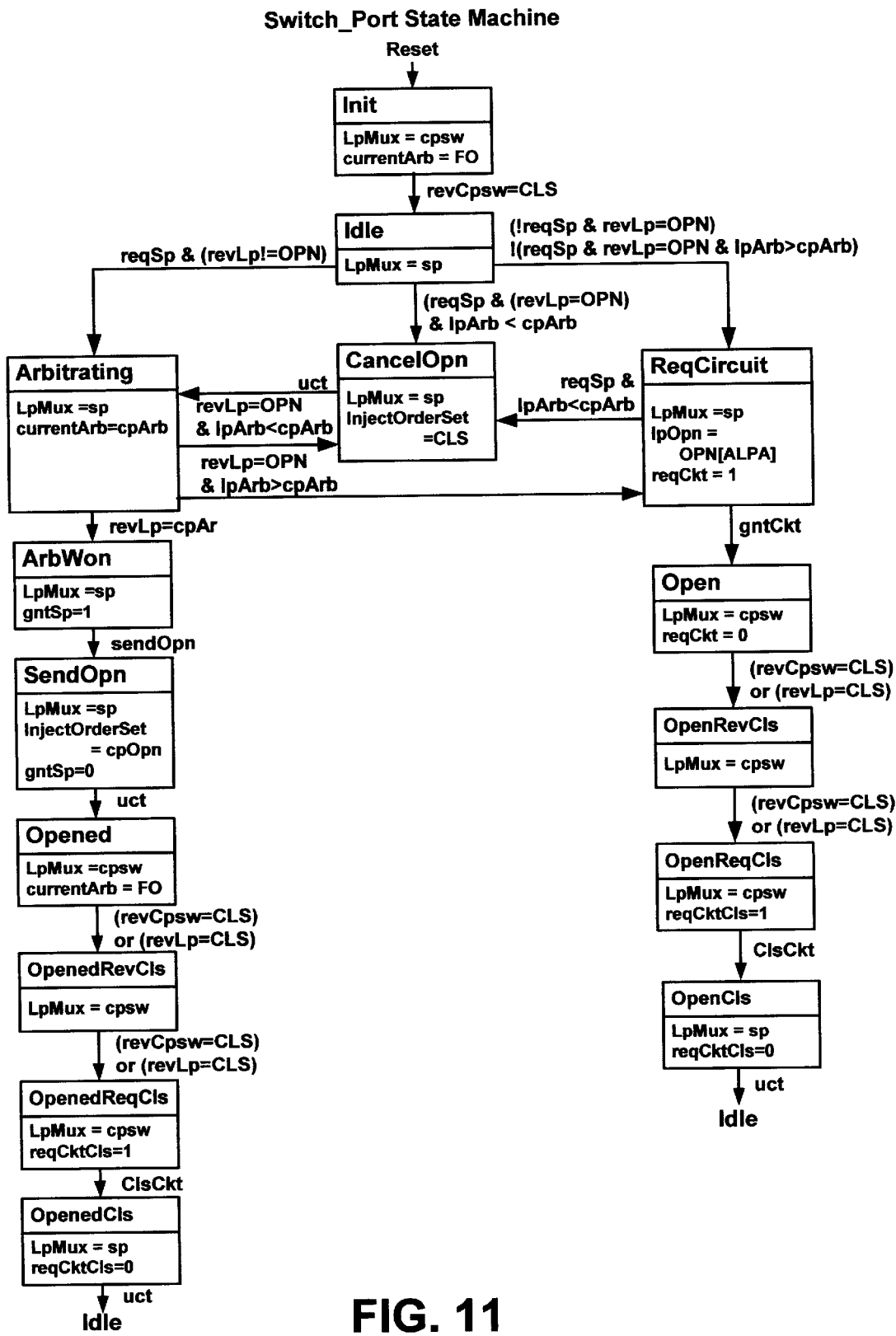
FIG. 11 is a state diagram illustrating one embodiment of switch arbitrated loop in accordance with one embodiment of the present claimed invention.

Specifically, referring to FIG. 5, in order to spoof, the SAL 30 monitors port login control frames, fabric login control frames, and the response frames to those login control frames (known as Accept Command Code frames, hereinafter ACC frames), passing therethrough for a reading of the login buffer-to-buffer credit value of the port that was the source of the captured frame (Step AO). The SAL 30 then associates the login buffer-to-buffer credit value with its source port (Step AP) for use in specifying the number of R_RDY primitive signals to be generated by the SAL 30. The SAL 30 then modifies the port login control frames, the fabric login control frames and the ACC frames to force zero login buffer-to-buffer credit value (Step AQ) and recalculates and replaces the checksum field of the port login control frames, the fabric login control frames and the ACC frames (Step AR).

A further feature of the invention is the ability to support full-duplex communication between loop ports A and B, to achieve greater bandwidth and lower latency. In this alternative, which is a straightforward modification of the process illustrated in FIG. 4, loop port A signals its intention to open a full-duplex communication path with loop port B by sending an OPN AB primitive signal (instead of the half-duplex OPN B primitive signal). Loop port A indicates its ability to absorb frames from loop port B by sending a series of one or more R_RDY primitive signals following the OPN AB primitive signal. The SAL 30 then must absorb and regenerate these R_RDY primitive signals to loop port B, following the retransmission of the OPN AB primitive signal to loop port B.

The invention has now been explained with reference to specific embodiments. Other embodiments will be apparent to those of ordinary skill in the art. It is therefore not intended that this invention be limited, except as indicated by the appended claims.

What is claimed is:

1. In a network employing a fibre channel arbitrated loop protocol having flow control credit management and a topology-dependent physical address for each loop port, a method for providing communication between a first loop port A and a second loop port B through a switched arbitrated loop, said method comprising:

issuing at any loop port a loop initialization protocol —LIP—primitive sequence in order to cause all loop ports to initialize on a single hub;

prioritizing each loop port by its physical address on the single hub;

isolating switch ports to separate said single hub into hub segments; and establishing a loop circuit between said first loop port A and said second loop port B through said switched arbitrated loop; wherein said loop circuit establishing step comprises:

issuing at said first loop port A a first arbitrate A primitive signal to said switched arbitrated loop, said first arbitrate A primitive signal being a request for access to a local loop of first loop port A;

in response to said arbitrate A primitive signal, issuing at said switched arbitrated loop a reflection of said first arbitrate A primitive signal to said first loop port A;

in response to said reflection of said first arbitrate A primitive signal, issuing at said first loop port A a first open B primitive signal to said switched arbitrated loop, said first open B primitive signal being a request to establish a half duplex circuit between said first loop port A and said second loop port B;

in response to said first open B primitive signal, issuing at said switched arbitrated loop to said second loop port B a second arbitrate A primitive signal, said second arbitrate A primitive signal being a request for access to a local loop of second loop port B;

in response to said second arbitrate A primitive signal, issuing at said second loop port B a reflection of said second arbitrate A primitive signal to said switched arbitrated loop;

in response to said reflection of said second arbitrate A primitive signal, issuing at said switched arbitrated loop a second open B primitive signal, said second open B primitive signal being absorbed by said second loop port B;

in response to said second open B primitive signal, issuing at said second loop port B at least one receive ready primitive signal to said switched arbitrated loop;

sending via said switched arbitrated loop at least one receive ready primitive signal to said first loop port A; and in response to receipt of said receive ready primitive signal at said first loop port A, issuing a data frame via said switched arbitrated loop to said second loop port B.

2. The method according to claim 1 wherein said at least one receive ready primitive signal is forwarded to said first loop port A from said second loop port B by said switched arbitrated loop in response to said second open B primitive signal.

3. The method according to claim 1 wherein said at least one receive ready primitive signal is generated by said switched arbitrated loop to said first loop port A in parallel with issuing said second open B primitive signal to said second loop port B; and absorbing one ready receive primitive signal at said switched arbitrated loop for each receive ready primitive generated by said switched arbitrated loop.

4. The method according to claim 3, further including the steps of:

monitoring, at said switched arbitrated loop, port login control frames, fabric login control frames, and accept command code frames passing therethrough for login buffer-to buffer credit value;

associating said login buffer-to-buffer credit value with its source port for use in specifying the number of receive ready primitive signals to be issued by said switched arbitrated loop in parallel with issuing said second open B primitive signal to said second loop port B;

modifying said port login control frames, said fabric login control frames and said accept command code frames to force zero login buffer-to-buffer credit value;

recalculating and replacing a checksum field of said port login control frames, said fabric login control frames and said accept command code frames.

5. The method according to claim 2, further including the steps of:

monitoring, at said switched arbitrated loop, port login control frames, fabric login control frames and accept command code frames passing therethrough for login buffer-to-buffer credit value;

modifying said port login control frames, said fabric login control frames and said accept command code frames to force zero login buffer-to-buffer credit value; and recalculating and replacing a checksum field of said port login control frames, said fabric login control frames and said accept command code frames.

6. In a network employing a fibre channel arbitrated loop protocol having flow control credit management and a topology-dependent physical address for each loop port, a method for providing communication between a first loop port A and a second loop port B through a switched arbitrated loop, said method comprising:

issuing at any loop port a loop initialization protocol— LIP—primitive sequence in order to cause all loop ports to initialize on a signal hub;

prioritizing each loop port on the switch arbitrated loop by its physical address on the single hub;

isolating switch ports to separate said single hub into hub segments;

issuing at said first loop port A a first arbitrate A primitive signal to said switched arbitrated loop, said first arbitrate A primitive signal being a request for access to a local loop of said first loop port A;

in response to said first arbitrate A primitive signal, issuing at said switched arbitrated loop a reflection of said first arbitrate A primitive signal to said first loop port A;

in response to said reflection of said arbitrate A primitive signal, issuing at said first loop port A a first open AB primitive signal to said switched arbitrated loop, said first open AB primitive signal being a request to establish a full duplex circuit between said first loop port A and said second loop port B;

following the issuing of said first open AB primitive signal, issuing at said first loop port A a first series of at least one receive ready primitive signals, the number of said receive ready primitive signals being an indication of the number of available receive buffers present at said first loop port A, said first series of at least one receive ready primitive signals being monitored and absorbed by said switched arbitrated loop;

in response to said first open AB primitive signal, issuing at said switched arbitrated loop to said second loop port B a second arbitrate A primitive signal, said second arbitrate A primitive signal being a request for access to a local loop of said second loop port B;

in response to said second arbitrate A primitive signal, issuing at said second loop port B a reflection of said second arbitrate A primitive signal to said switched arbitrated loop;

in response to said reflection of said second arbitrate A primitive signal, issuing at said switched arbitrated loop a second open AB primitive signal, followed by a second series of receive ready primitive signals, equal in number to said first series of receive ready primitive signals issued by said first loop port A, said second open AB primitive signal and said second series of receive ready primitive signals being absorbed by said second loop port B;

in response to said second open AB primitive signal, issuing at said second loop port B a third series of at least one receive ready primitive signals to said switched arbitrated loop, the number of receive ready primitive signals of said third series being an indication of the number of available receive buffers present at said second loop port B;

sending via said switched arbitrated loop said third series of said receive ready primitive signals to said first loop port A;

in response to receipt of said third series of receive ready primitive signals at said first loop port A, issuing a first data frame via said switched arbitrated loop to said second loop port B;

in response to said second series of receive ready primitive signals at said second loop port B, issuing at said second loop port B a second data frame via said switched arbitrated loop to said first loop port A.

7. The method according to claim 6 wherein said third series of receive ready primitive signals is forwarded to said first loop port A from said second loop port B by said switched arbitrated loop in response to said second open AB primitive signal.

8. The method according to claim 6 wherein at least one receive ready primitive signal is generated by said switched arbitrated loop to said first loop port A in parallel with issuing said second open AB primitive signal to said second loop port B; and absorbing one receive ready primitive signal of said third series at said switched arbitrated loop for each receive ready primitive generated to said first loop port A by said switched arbitrated loop.

9. The method according to claim 8, further including the steps of:

monitoring, at said switched arbitrated loop, port login control frames, fabric login control frames and accept command code frames passing therethrough for login buffer-to-buffer credit value;

associating said login buffer-to-buffer credit value with its source port for use in specifying the number of receive ready primitive signals to be issued by said switched arbitrated loop in parallel with issuing said second open AB primitive signal to said second loop port B;

modifying said port login control frames, said fabric login control frames and said accept command code frames to force zero login buffer-to-buffer credit value;

recalculating and replacing a checksum field of said port login control frames, said fabric login control frames and said accept command control frames.

10. The method according to claim 7, further including the steps of:

monitoring, at said switched arbitrated loop, port login control frames, fabric login control frames and accept command control frames passing therethrough for login buffer-to-buffer credit value;

modifying said port login control frames, said fabric login control frames and said accept command control frames to force zero login buffer-to-buffer credit value; and recalculating and replacing a checksum field of said port login control frames, said fabric login control frames and said accept command control frames.

11. In a network employing a fibre channel arbitrated loop protocol having flow control credit management and a topology-dependent physical address for each loop port, a switched arbitrated loop for providing communication between a first loop port A and a second loop port B comprising:

means coupled to each loop port for issuing a loop initialization protocol—LIP—primitive sequence in order to cause each loop port to initialize on a single hub;

means for prioritizing said each loop port by its physical address on the single hub;

means for isolating switch ports to separate said single hub into hub segments;

means operative to the issuing said LIP at said first loop port of a first arbitrate A primitive signal, said first arbitrate A primitive signal being a request for access to a local loop of first loop port A, by issuing a reflection of said first arbitrate A primitive signal to said first loop port;

means operative to the issuing at said first loop port of a first open AB primitive signal, said first open AB primitive being a request to establish a circuit between said first loop port A and said second loop port B, by issuing to said second loop port B a second arbitrate A primitive signal, said second arbitrate A primitive signal being a request for access to a local loop of the second loop port B;

means operative to the issuing said LIP at said second loop port B of a reflection of said second arbitrate A primitive signal to said switched arbitrated loop, by issuing a second open AB primitive signal, said second open AB primitive signal being absorbed by said second loop port B;

means operative to the issuing said LIP at said second loop port B at least one receive ready primitive signal to said switched arbitrated loop;

means for sending at least one receive ready primitive signal to said first loop port A; and means for forwarding a data frame from said first loop port A to said second loop port B.

12. The switched arbitrated loop according to claim 11, further including:

means for monitoring port login control frames and fabric login control frames passing therethrough for login buffer-to-buffer credit value;

means for modifying said port login control frames and said fabric login control frames to force zero login buffer-to-buffer credit value; and means for recalculating and replacing a checksum field of said port login control frames and said fabric login control frames.

* * * * *